US010041578B2

(12) United States Patent
Dell

(10) Patent No.: US 10,041,578 B2
(45) Date of Patent: Aug. 7, 2018

(54) SPRING ASSEMBLY FOR ISOLATOR

(71) Applicant: LITENS AUTOMOTIVE PARTNERSHIP, Woodbridge (CA)

(72) Inventor: James W. Dell, Newmarket (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 139 days.

(21) Appl. No.: 14/899,152

(22) PCT Filed: Jul. 25, 2014

(86) PCT No.: PCT/CA2014/000587
§ 371 (c)(1),
(2) Date: Dec. 17, 2015

(87) PCT Pub. No.: WO2015/010187
PCT Pub. Date: Jan. 29, 2015

(65) Prior Publication Data
US 2016/0138699 A1 May 19, 2016

Related U.S. Application Data

(60) Provisional application No. 61/858,172, filed on Jul. 25, 2013.

(51) Int. Cl.
*F16H 55/36* (2006.01)
*F16F 3/04* (2006.01)
(Continued)

(52) U.S. Cl.
CPC .............. *F16H 55/36* (2013.01); *B60K 25/02* (2013.01); *F16F 1/12* (2013.01); *F16F 3/04* (2013.01);
(Continued)

(58) Field of Classification Search
CPC ........ F16H 55/36; F16H 7/18; F16H 2055/36; B60K 25/02; B60K 2025/022; F16F 1/12; F16F 3/04; F16F 15/123; F02B 67/06
See application file for complete search history.

(56) References Cited

U.S. PATENT DOCUMENTS 3,556,273 A 1/1971 Luk
3,666,021 A 5/1972 Whitehouse
(Continued)

FOREIGN PATENT DOCUMENTS

CA 2753767 A1 9/2010
CA 2802116 A1 12/2011
(Continued)

OTHER PUBLICATIONS

Extend European search report for EP3025072 dated Feb. 17, 2017.
(Continued)

*Primary Examiner* — Michael R Mansen
*Assistant Examiner* — Robert T Reese
(74) *Attorney, Agent, or Firm* — Millman IP Inc.

(57) ABSTRACT

In an aspect, a spring assembly is provided for an isolator, and includes first and second helical compression springs, a retainer and a spring housing. The first helical compression spring has a central aperture and has a first end and a second end. The second helical compression spring having a central aperture and having a first end and a second end, wherein the second spring is coaxial with and nested within the first spring. The retainer has a base and a post that extends from the base into the central aperture at the first end of the second helical spring. The spring housing that has an interior space in which the first and second springs are positioned, and further includes a base-engaging aperture that holds the base of the retainer. The spring housing includes a drive wall that is engaged with the first ends of the first and second springs.

14 Claims, 7 Drawing Sheets

US 10,041,578 B2
Page 2

(51) Int. Cl.
  *B60K 25/02* (2006.01)
  *F16F 15/123* (2006.01)
  *F16H 7/18* (2006.01)
  *F16F 1/12* (2006.01)
  *F02B 67/06* (2006.01)

(52) U.S. Cl.
  CPC ............ *F16F 15/123* (2013.01); *F16H 7/18* (2013.01); *B60K 2025/022* (2013.01); *F02B 67/06* (2013.01); *F16H 2055/366* (2013.01)

(56) References Cited

U.S. PATENT DOCUMENTS

| | | | |
|---|---|---|---|
| 4,092,837 | A | 6/1978 | Gebauer et al. |
| 4,483,685 | A | 11/1984 | Spasiano et al. |
| 4,591,868 | A | 5/1986 | Cusey et al. |
| 4,690,256 | A | 9/1987 | Bopp et al. |
| 4,733,991 | A * | 3/1988 | Myers ............... E21B 19/006 114/264 |
| 4,787,778 | A * | 11/1988 | Myers ............... E21B 19/006 166/367 |
| 4,883,387 | A * | 11/1989 | Myers ............... E21B 19/006 166/367 |
| 5,048,657 | A | 9/1991 | Dissett et al. |
| 5,380,248 | A * | 1/1995 | Kraus ............... F16F 15/1343 464/66.1 |
| 5,893,355 | A | 4/1999 | Glover et al. |
| 5,964,674 | A | 10/1999 | Serkh et al. |
| 6,044,943 | A | 4/2000 | Bytzek et al. |
| 6,083,130 | A | 7/2000 | Mevissen et al. |
| 6,131,487 | A * | 10/2000 | Jackel ............... F16F 15/1343 192/106 R |
| 6,244,577 | B1 | 6/2001 | Bucholtz |
| 6,712,706 | B2 | 3/2004 | Jackel et al. |
| 7,153,227 | B2 | 12/2006 | Dell et al. |
| 7,204,772 | B2 | 4/2007 | Huber |
| 7,207,910 | B2 | 4/2007 | Dell et al. |
| 7,217,204 | B2 | 5/2007 | Roby |
| 7,510,062 | B2 | 3/2009 | Derr |
| 7,624,852 | B2 | 12/2009 | Mevissen et al. |
| 7,708,661 | B2 | 5/2010 | Pflug et al. |
| 7,878,315 | B2 | 2/2011 | Saito et al. |
| 7,891,475 | B2 | 2/2011 | Zhu et al. |
| 7,892,124 | B2 | 2/2011 | Hodjat et al. |
| 7,954,613 | B2 | 6/2011 | Mevissen et al. |
| 8,021,253 | B2 | 9/2011 | Dell et al. |
| 8,028,602 | B2 | 10/2011 | Crist |
| 8,038,554 | B2 | 10/2011 | Watababe et al. |
| 8,192,312 | B2 | 6/2012 | Ali et al. |
| 8,276,720 | B2 | 10/2012 | Farahati et al. |
| 8,313,400 | B2 | 10/2012 | Serkh et al. |
| 8,419,574 | B2 | 8/2013 | Serkh et al. |
| 9,194,438 | B2 | 11/2015 | Dell |
| 2002/0019263 | A1 | 2/2002 | Jackel et al. |
| 2004/0014540 | A1 | 1/2004 | Dell et al. |
| 2004/0226393 | A1 | 11/2004 | Hong |
| 2006/0122014 | A1 | 6/2006 | Kamdem |
| 2006/0172832 | A1 | 8/2006 | Watababe et al. |
| 2006/0264280 | A1 | 11/2006 | Dell et al. |
| 2008/0139351 | A1 | 6/2008 | Pflug et al. |
| 2008/0312014 | A1 | 12/2008 | Stief et al. |
| 2009/0022377 | A1 | 1/2009 | Matsue et al. |
| 2009/0107791 | A1 | 4/2009 | Zhu et al. |
| 2009/0121401 | A1 | 6/2009 | Lehmann et al. |
| 2009/0176583 | A1 | 7/2009 | Dell et al. |
| 2009/0194380 | A1 | 8/2009 | Ali et al. |
| 2009/0223775 | A1 | 9/2009 | Hodjat et al. |
| 2010/0032258 | A1 | 2/2010 | Mevissen et al. |
| 2010/0099527 | A1 | 4/2010 | Rolando |
| 2010/0120563 | A1 | 5/2010 | Serkh et al. |
| 2010/0167856 | A1 | 7/2010 | Hartmann et al. |
| 2011/0245000 | A1 | 10/2011 | Serkh et al. |
| 2011/0256968 | A1 | 10/2011 | Serkh et al. |
| 2011/0263365 | A1 | 10/2011 | Hartmut et al. |
| 2011/0315502 | A1 | 12/2011 | Antchak et al. |
| 2012/0015768 | A1 | 1/2012 | Serkh et al. |
| 2012/0088616 | A1 | 4/2012 | Ali et al. |
| 2012/0094791 | A1 | 4/2012 | Lee |
| 2012/0149511 | A1 | 6/2012 | Hodjat |
| 2013/0098733 | A1 | 4/2013 | Antchak et al. |
| 2016/0123453 | A1 | 5/2016 | Starodoubov et al. |

FOREIGN PATENT DOCUMENTS

| | | |
|---|---|---|
| CN | 101275612 A | 10/2008 |
| CN | 101915298 A | 12/2010 |
| CN | 102341610 A | 2/2012 |
| DE | 21202 | 4/1961 |
| DE | 4424988 C1 | 6/1995 |
| DE | 19730001 A1 | 1/1999 |
| DE | 19912970 A1 | 9/1999 |
| DE | 19919449 A1 | 11/1999 |
| DE | 102005016897 A1 | 10/2006 |
| DE | 102005062318 A1 | 7/2007 |
| DE | 102006039362 A1 | 3/2008 |
| DE | 102007058018 A1 | 7/2008 |
| DE | 102008059263 A1 | 6/2009 |
| DE | 102009039989 A1 | 4/2010 |
| DE | 102009052058 A1 | 6/2010 |
| DE | 102010023714 A1 | 1/2011 |
| EP | 0349267 A1 | 6/1989 |
| EP | 0934843 B1 | 5/2004 |
| EP | 1645783 A1 | 4/2006 |
| EP | 1662161 A1 | 5/2006 |
| EP | 01710465 A1 | 11/2006 |
| EP | 1621796 B1 | 10/2007 |
| EP | 1939494 A2 | 7/2008 |
| EP | 2148109 A1 | 1/2010 |
| EP | 2255100 A1 | 12/2010 |
| EP | 2273144 A1 | 1/2011 |
| EP | 2235400 A4 | 6/2011 |
| EP | 01621796 B2 | 10/2011 |
| EP | 2203655 B1 | 3/2012 |
| EP | 2638304 A1 | 9/2013 |
| EP | 2556274 B1 | 5/2014 |
| EP | 2558749 B1 | 6/2014 |
| GB | 2308173 A | 6/1997 |
| KR | 1020110131197 A | 12/2011 |
| WO | 9110075 A1 | 7/1991 |
| WO | 9612122 A1 | 4/1996 |
| WO | 9821062 A1 | 5/1998 |
| WO | 03046407 A1 | 6/2003 |
| WO | 2005005865 A1 | 1/2005 |
| WO | 2005028899 A1 | 3/2005 |
| WO | 2007074016 A1 | 7/2007 |
| WO | 2007077414 A1 | 7/2007 |
| WO | 2007077415 A1 | 7/2007 |
| WO | 2007121582 A1 | 11/2007 |
| WO | 2008002845 A2 | 1/2008 |
| WO | 2008022897 A1 | 2/2008 |
| WO | 2008049388 A2 | 5/2008 |
| WO | 2008058499 A2 | 5/2008 |
| WO | 2008067915 A1 | 6/2008 |
| WO | 2008071306 A1 | 6/2008 |
| WO | 2009099504 A2 | 8/2009 |
| WO | 2009111036 A1 | 9/2009 |
| WO | 2010005880 A1 | 1/2010 |
| WO | 2010099605 A1 | 9/2010 |
| WO | 2011126916 A1 | 10/2011 |
| WO | 2011130106 A1 | 10/2011 |
| WO | 2011160215 A1 | 12/2011 |
| WO | 2012009314 A1 | 1/2012 |
| WO | 2012061930 A1 | 5/2012 |
| WO | 2012082479 A1 | 6/2012 |
| WO | 2013033825 A1 | 3/2013 |
| WO | 2013124009 A1 | 8/2013 |

OTHER PUBLICATIONS

Office Action for CN201380053505.8 dated Feb. 23, 2017.
Office Action for CN201380053505.8 dated Feb. 23, 2017, English translation.

(56) References Cited

OTHER PUBLICATIONS

International Search Report for PCT/CA2014/000587, Nov. 3, 2014, ISA.
Written Opinion for PCT/CA2014/000587, dated Nov. 3, 2014, ISA.
Installation Instructions for KPMI Part No. 90/9034 BMW (Lightweight Racing Vale Spring Kit), 1970, Kibblewhite Precision Machining, Inc.
International Preliminary Report on Patentability for PCT/CA2013/000881 dated Apr. 15, 2015.
English translation of Office Action for CN201380053505.8 dated Apr. 12, 2016.
International Search Report for PCT/CA2013/000881 dated Jan. 28, 2014.
Office Action for CN201380053505.8 dated Apr. 12, 2016.
Office Action for U.S. Appl. No. 14/470,937 dated Jan. 29, 2016.
ISR & WO for PCT/CA2014/000592 dated Oct. 29, 2014.
Office Action for CN201480041438.2 dated Mar. 2, 2017.
Office Action for CN201480041438.2 dated Mar. 2, 2017—English translation.
Reporting letter for Office Action for CN201480041438.2 dated Mar. 28, 2017.
Extended European Search Report for EP103806 dated Jul. 7, 2017.
Extended European Search Report for EP14859575 dated Jun. 6, 2017.
Office Action for CN201480029125.5 dated Jul. 24, 2017.
Office Action for CN201480029125.5 dated Jul. 24, 2017—English Translation.
Office Action for CN201480041408.1 dated Aug. 21, 2017.
Office Action for CN201480041408.1 dated Aug. 21, 2017—English Translation.
Chinese Office Action for CN201480041408.1 dated Feb. 28, 2018.
English Translation of the form in the Chinese Office Action of CN201480041408.1 dated Feb. 28, 2018.
English Translation of the text in Chinese Office Action for CN201480041408.1 dated Feb. 28, 2018.
Chinese Office Action for CN201480061550.2 dated Dec. 5, 2017.
English Translation of Chinese Office Action for CN201480061550.2 dated Dec. 5, 2017.

* cited by examiner

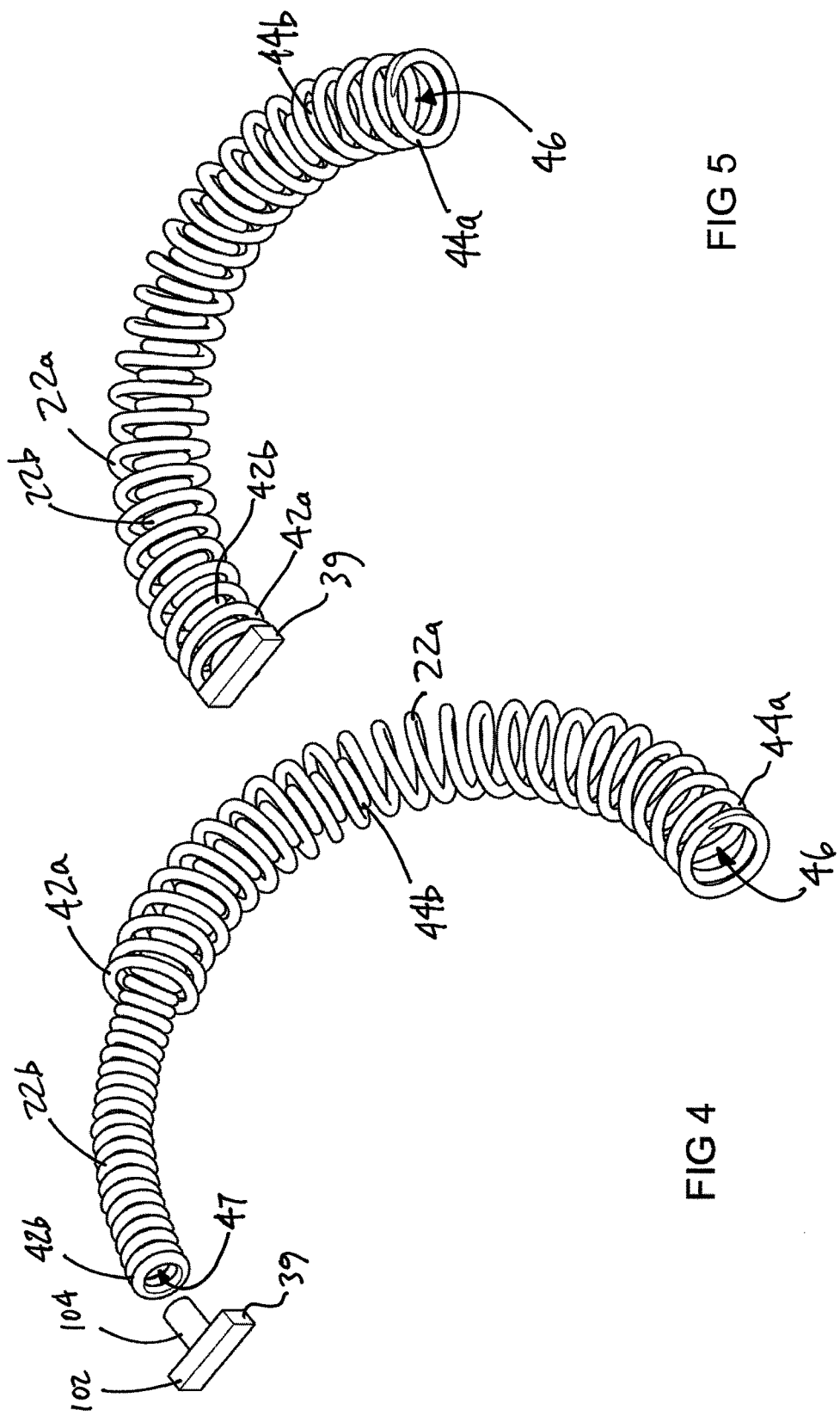

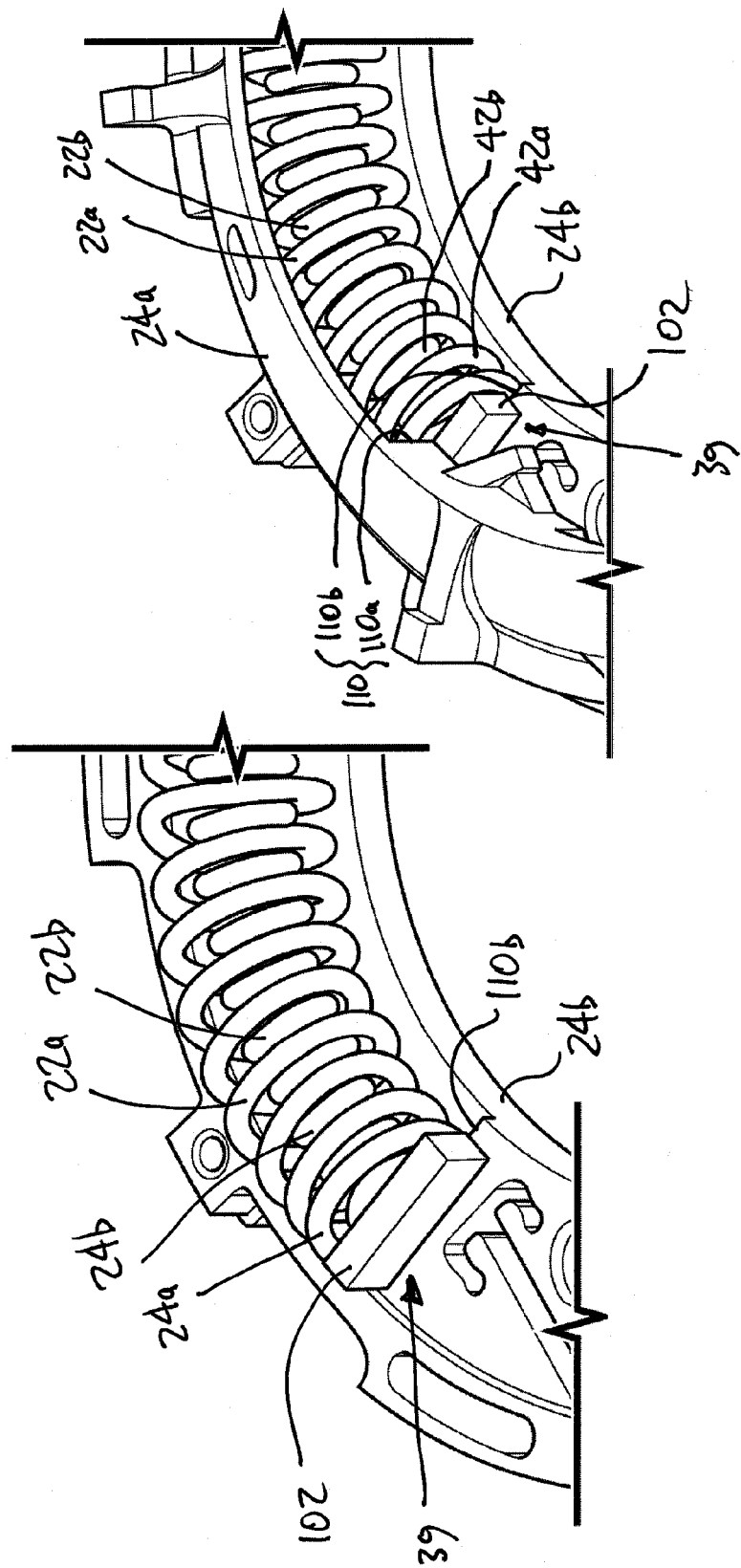

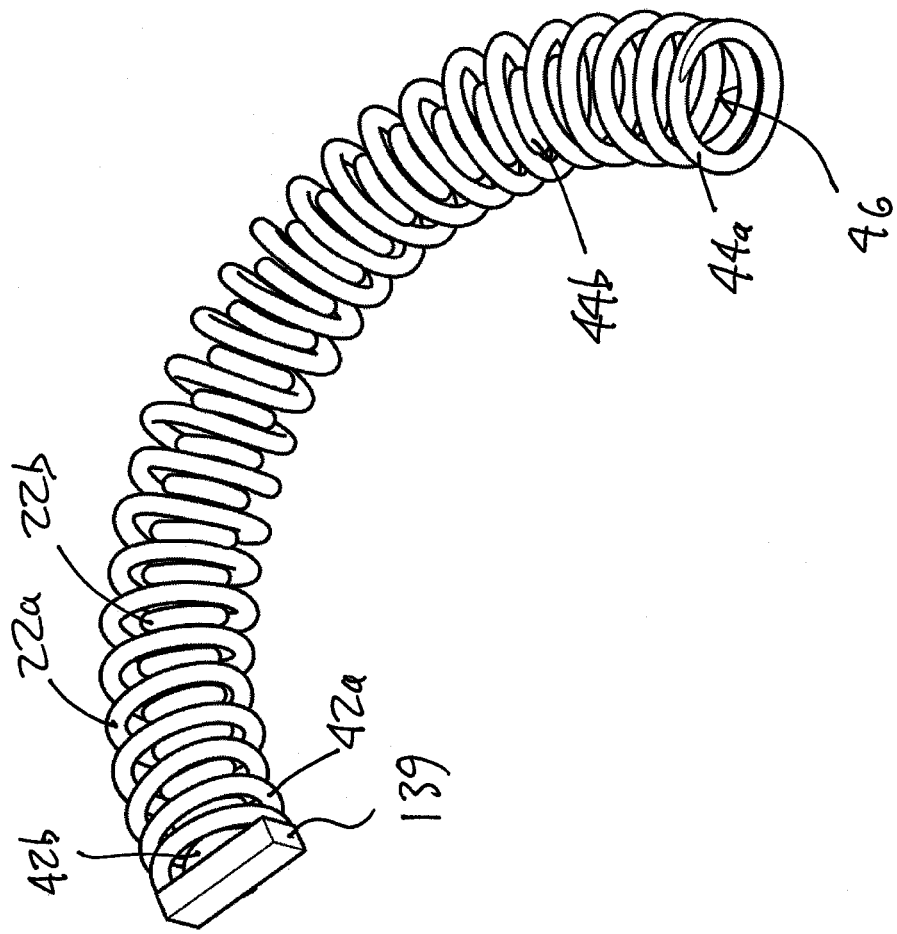
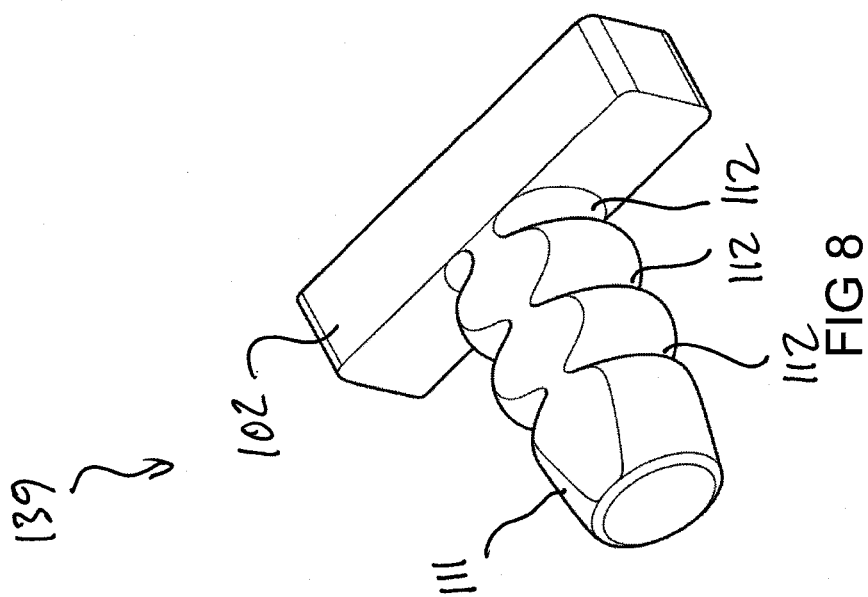

SPRING ASSEMBLY FOR ISOLATOR

CROSS-REFERENCE TO RELATED APPLICATIONS

This application claims the benefit of U.S. Provisional Patent Application No. 61/858,172, filed Jul. 25, 2013, the contents of which are incorporated by reference as if fully set forth in detail herein.

FIELD

The present invention relates to isolators and in particular isolators for use between the engine crankshaft and an endless drive member such as a belt.

BACKGROUND

An isolator is usually used for isolating a crankshaft pulley and its associated belt (e.g. an accessory drive belt) from torsional vibration from the crankshaft that is a result of reciprocation of masses (e.g. pistons) in an internal combustion engine, and in particular engines with certain cylinder counts such as four- or- three cylinder engines, and diesel engines. Some isolators incorporate two pairs of springs, where in each pair there is one outer spring that has a central aperture and one inner spring that is positioned in the central aperture of the outer spring. Such isolators suffer from noise issues however, due to sliding movement of the inner spring in the central aperture, since in many cases the inner spring is shorter lengthwise than the outer spring.

SUMMARY

In an aspect, a spring assembly is provided for an isolator or any other suitable torque transfer device, and includes first and second helical compression springs, a retainer and a spring housing. The first helical compression spring has a central aperture and has a first end and a second end. The second helical compression spring having a central aperture and having a first end and a second end, wherein the second spring is coaxial with and nested within the first spring. The retainer has a base and a post that extends from the base into the central aperture at the first end of the second helical spring. The spring housing that has an interior space in which the first and second springs are positioned, and further includes a base-engaging aperture that holds the base of the retainer. The spring housing includes a drive wall that is engaged with the first ends of the first and second springs.

In another aspect, an isolator is provided that includes the spring assembly described above.

Other features and advantages will be apparent by following the description with references to the drawings.

BRIEF DESCRIPTION ON THE DRAWINGS

The foregoing and other aspects of the disclosure will be more readily appreciated by reference to the accompanying drawings, wherein:

FIG. 2 is a perspective exploded view of the isolator shown in FIG. 1a;

FIG. 4 is a perspective exploded view of first and second springs and a retainer that are part of the isolator shown in FIG. 1a;

FIG. 5 is a perspective unexploded view of the springs and the retainer shown in FIG. 4 assembled together;

FIG. 6 is a perspective view of the springs and retainer shown in FIG. 5, mounted in part of a spring housing;

FIG. 7 is a perspective view of the springs and retainer shown in FIG. 5, mounted in the complete spring housing, thereby forming a spring assembly;

FIG. 8 is a perspective view of an alternative retainer that can be used with the isolator; and FIG. 9 is a perspective view of the two springs with the retainer shown in FIG. 8.

DETAILED DESCRIPTION OF EMBODIMENTS

Figure 1:
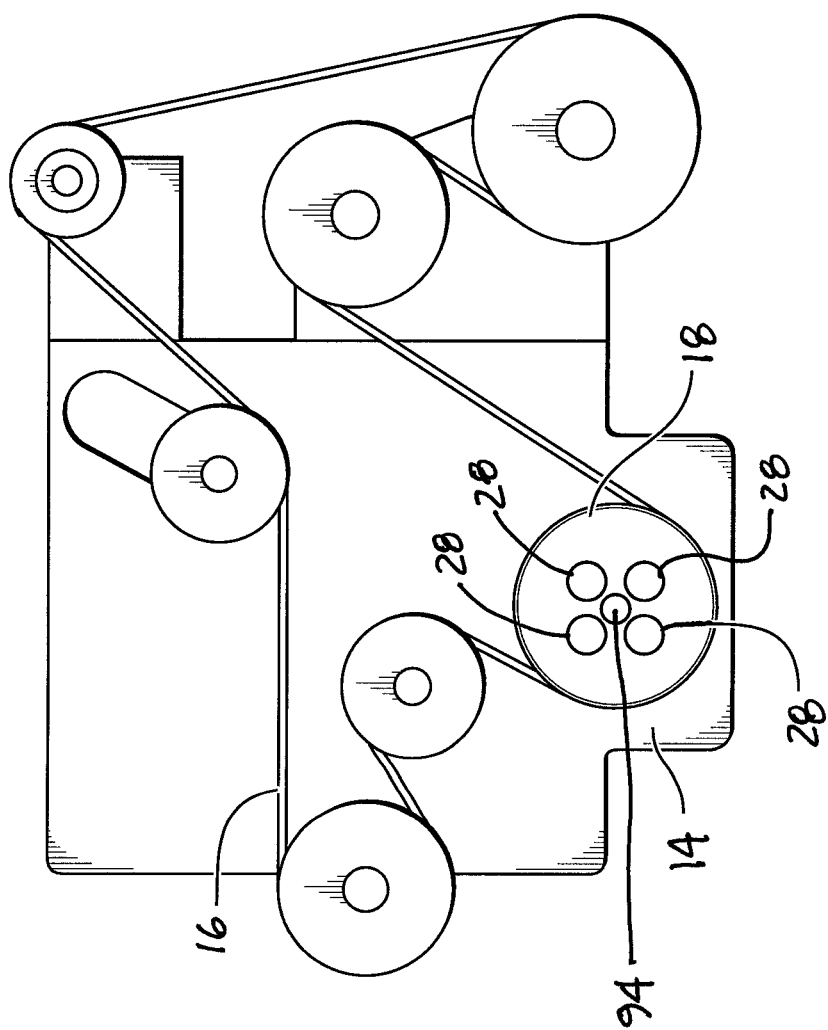
FIG. 1 is an elevation view of an engine with a crankshaft, a driven belt and an isolator including a spring assembly in accordance with an embodiment of the present invention.

Reference is made to FIG. 1, which shows an isolator 10 for transferring power between a crankshaft 12 on an engine 14 and an endless drive member 16, such as an accessory drive belt, in accordance with an embodiment of the present invention. The isolator 10 isolates the endless drive member 16 from vibrations or other sudden changes in torque in the crankshaft 12, and vice versa.

Figure 2:
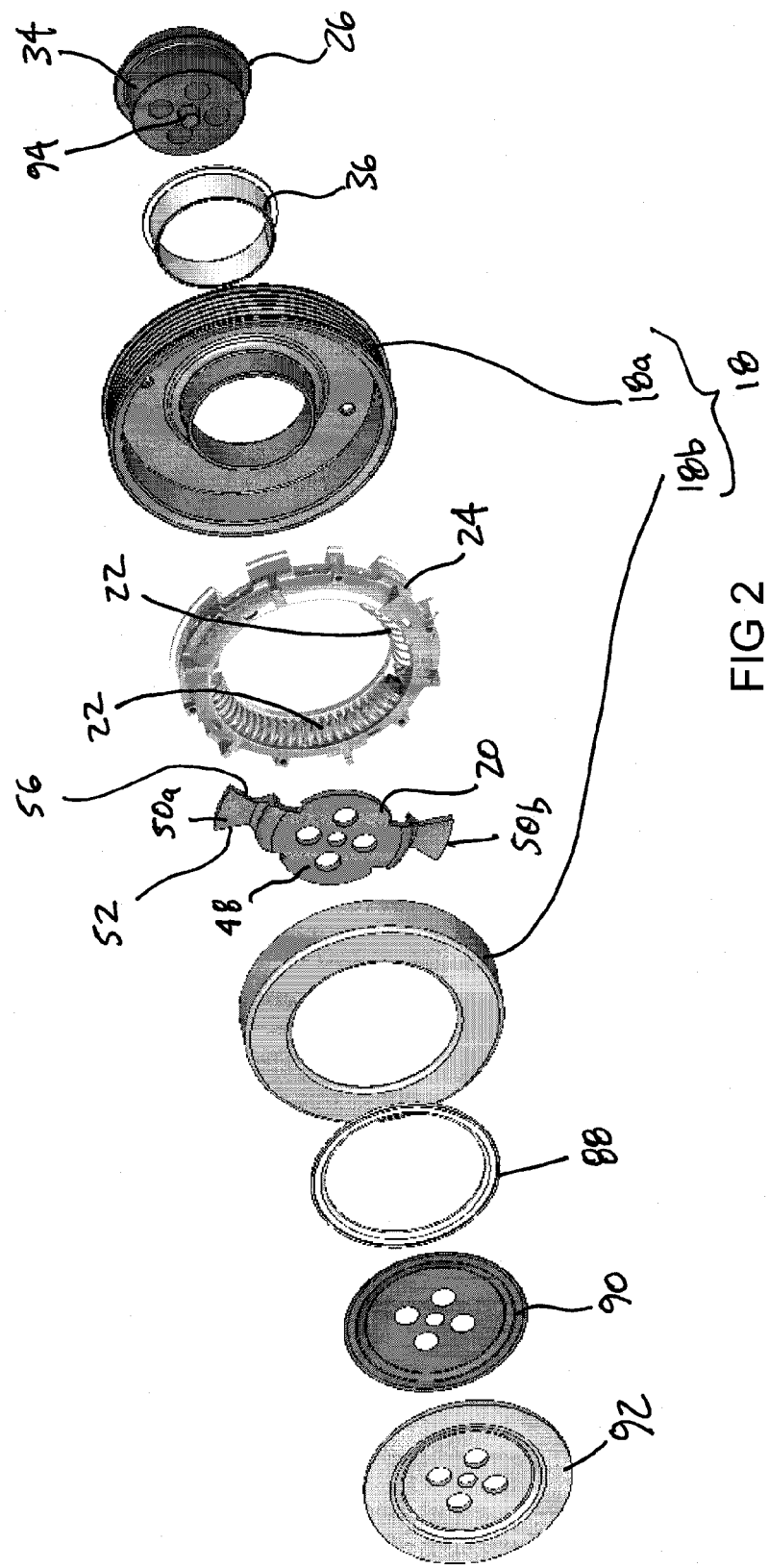
Figure 3:
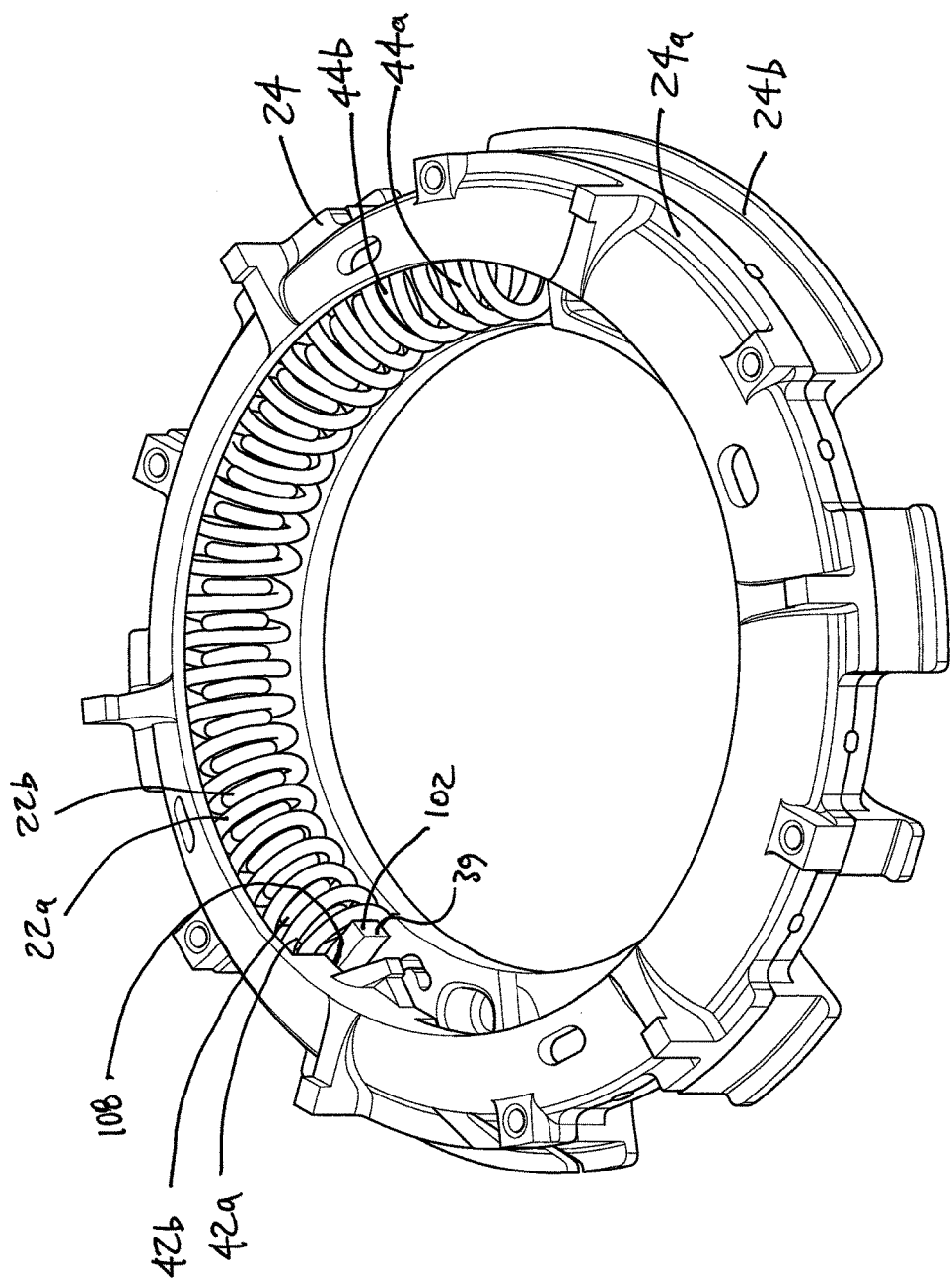

As seen in FIGS. 2 and 3, the isolator 10 includes a pulley 18, a driver 20, first and second isolation spring assemblies 21, which include at least one pair of first and second springs 22 (shown individually at 22a and 22b), a retainer 39, and an optional spring shell 24.

The driver 20 is fixedly mountable in any suitable way to the crankshaft 12 for rotation about an axis A. For example, a shaft adapter 26 may be provided that mounts to the crankshaft 12 via a plurality of threaded fasteners (shown at 28 in FIG. 1) such as four spline socket head cap screws that pass through apertures in the adapter 26 and into threaded apertures 32 in the end of the crankshaft 12.

The driver 20 may be made from any suitable material such as a suitable metal, such as steel.

The shaft adapter 26 may include a support surface 34 for supporting a bushing 36 that in turn supports a bushing engagement surface 38 on the pulley 18 so as to permit relative rotation between the pulley 18 and the crankshaft 12, the shaft adapter 26 and the driver 20. The bushing 36 may also include a radial lip that acts as a thrust bushing portion that is engaged by and supports the pulley 18 in the axial direction. The bushing 36 may be made from any suitable material such as nylon.

The pulley 18 is supported for rotation relative to the crankshaft 12 and is engageable with the belt 16. It will be noted that the term 'belt' is used for convenience, but instead it may be any suitable endless drive member. Analogously, the term 'pulley' is used for convenience, but instead it may be any suitable rotary member that is engageable with the endless drive member.

The pulley 18, in the embodiment shown has a belt engagement surface 40 that is configured to engage a poly-V groove belt. The pulley 18 may be made from two elements including a main portion 18a and a cover member 18b that is connected to the main portion 18a via any suitable means (e.g. by means of a press-fit). The pulley 18 may be made from any suitable material such as a suitable metal, such as steel.

The spring assemblies 22 elastically deform to isolate the endless drive member 16 and the crankshaft 12 from vibrations or other sudden changes in torque in one another. The spring assemblies 22 in the examples each include first and second arcuate, helical coil compression springs 22a and 22b wherein one is nested within the other, and a retainer 39.

While two spring assemblies 22 are shown in FIG. 2, it will be understood that the isolator could alternatively have a single spring assembly 22 or three or more spring assemblies 22.

FIG. 3 shows only one spring assembly 22 in the spring housing 24, for simplicity. Referring to FIGS. 3, 4 and 5, each spring 22a and 22b has a first end, shown at 42a for spring 22a, and 42b for spring 22b. Each spring 22a and 22b has a second end, shown at 44a for spring 22a, and 44b for spring 22b. The first spring 22a may be referred to as the outer spring 22a, and has a central aperture 46 in which the second, or inner, spring 22b extends. The second spring 22b also has a central aperture 47, as shown in FIG. 4.

Referring to FIGS. 4 and 5, the retainer 39 includes a base portion 102 and a projection 104. The post 104 extends from the base 102 and fits snugly into the central aperture 47 at the first end 42b of the second spring 22b. The spring housing 24 has an interior space 106 in which the first and second springs 22a and 22b are positioned, and further includes a base-engaging structure 108 that holds the base 102 of the retainer 39. The spring housing 24 includes a drive wall 110 (made up of first and second drive wall portions 110a and 110b) that engages the first ends 42a and 42b of the first and second springs 22a and 22b directly, so that force transfer between both of the springs 22a and 22b and the spring housing 24 takes place directly and not through the retainer 39.

As can be seen in FIG. 5, the base 102 extends across the first ends 42a and 42b of both the first and second springs 22a and 22b.

When the springs 22a and 22b are positioned in the spring housing 24, the first spring 22a will be in a slight state of preload or compression. This pins the base 102 in the base-engaging structure 108 and ensures that there is no movement between the first spring 22a and the retainer 39. The second spring 22b remains fixed in position relative to the first spring 22a by virtue of being snugly mounted to the post 104 of the retainer 39.

The springs 22a and 22b may be made from any suitable material such as a suitable metal such as steel.

The retainer 39 may be made from any suitable material such as a polymeric material, such as nylon, or some other flexible material that permits it to be snugly inserted into the central aperture 47 of the second spring 22b.

While the spring housing 24 is shown as being a separate structure from the pulley 18, it is alternatively possible for the spring housing 24 to be integral with the pulley 18. The pulley 18 may engage the spring housing 24 in any suitable way, such as by lugs on the pulley that engage lug receiving apertures in the spring housing 24, and/or by a press-fit connection.

The driver 20 has a central body 48, a first arm 50a and a second arm 50b. Each of the first and second arms 50a and 50b has a first side 52 and a second side 56. The first side 52 is engageable with the spring end 44a of one of the first springs 22 so as to transfer torque therebetween. Furthermore, if the torque transfer between the driver 20 and pulley 18 is sufficiently high to cause a large amount of compression of the spring 22a, the first side 52 of the arms 50a and 50b is engageable with the spring end 44b of the second spring 22b, at which point both springs 22a and 22b act to transfer torque between the driver 20 and the pulley 18. In general torque transfer may take place from the driver 20 to the springs 22, and from the springs 22 to the pulley 18 through the spring housing 24 substantially without transferring any of the force through the retainers 39.

The retainers 39 serve to prevent the inner spring 22b from sliding around in the central aperture 46.

Referring to FIG. 3, the spring housing 24 may be made from two spring housing portions 24a and 24b, which may be assembled together in any suitable way, such as by use of one or more clip members on either or both housing portions 24a and 24b that engage clip receiving shoulders configured to lockingly receive the one or more clip members. The two housing portions 24a and 24b may together define the base-engaging structure 108 and may provide the press-fit with the base 102 of the retainer 39.

In the embodiment shown, the isolator 10 further includes a seal member 88, a seal biasing member 90 and a dust shield 92. These cooperate to prevent leakage of lubricant (e.g. grease) out from the interior space of the pulley and to inhibit dust and debris from entering into the interior space of the isolator 10. The seal member 88 additionally acts as another thrust bushing which is urged into engagement with the pulley 18 (specifically the cover member 18b), by the seal biasing member 90, so as to urge the pulley 18 and the bushing 36 over to a datum point against a shoulder on the shaft adapter 26 at one end of the support surface 34. The dust shield 92 could instead be some other component such as a torsional vibration damper that is connected indirectly to the crankshaft 12 via the driver 20a and the shaft adapter 26 to reduce the amplitude of angular reciprocation of the crankshaft 12 during torsional vibration thereof, particularly at higher RPM.

Figure 1A:
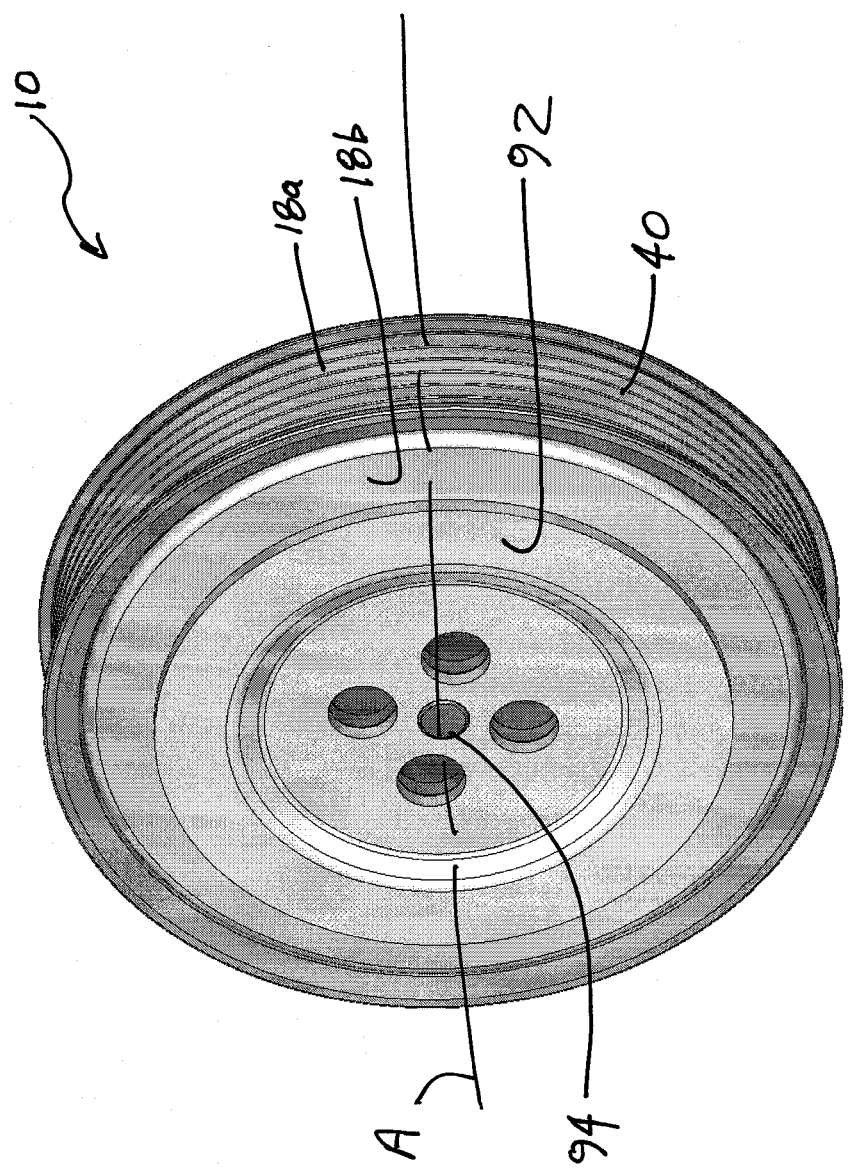
FIG. 1a is a perspective right-side view of the isolator shown in FIG. 1.

A projection 94 (FIGS. 1a and 2) on the shaft adapter 26 may be passed through apertures in the dust shield 92, the biasing member 90, and the driver 20 to ensure alignment of these components with the axis A. The projection 94 could be staked afterwards so that all these components remain mounted to the shaft adapter 26 to form a subassembly.

Reference is made to FIG. 8, which shows a retainer 139 that is similar to retainer 39, and has a base 102, but which a post 111 that has circumferentially extending recesses 112. The recesses 112 engage coils from the inner spring 22b so as to better retain the inner spring 22b thereon.

While the arc lengths of the springs 22a and 22b are shown to be different (such that the arc length of the second spring 22b is shorter than the arc length of the first spring 22a), it is alternatively possible for two springs 22a and 22b to have the same arc length.

In the embodiment shown, it has been described for the isolator 10 to be installed on the crankshaft 12 of an engine 14. It will be noted that the isolator 10 could alternatively be installed on the shaft of an accessory that is driven by the belt 16, such as, for example on a shaft of a steering pump. In such an embodiment, torque transfer would generally occur from the pulley 18 to the driver 20 and shaft adapter 26 through the isolation springs 22. The driver 20, in such an embodiment, would drive the shaft of the accessory instead of driving the pulley 18. Put more broadly, the isolator 10 may be used on any engine for isolating between any suitable input member (such as a belt, or a crankshaft) and any suitable output member (such as an accessory input shaft, or a belt). Additionally, the driver 20 is just one example of a first rotary drive member, and the pulley is just one example of a second rotary drive member. For example, the pulley 18 could instead be a gear that drives a gear train and that is driven be the engine crankshaft via the driver 20 and through the isolation springs 22.

While the engine 14 may be a vehicular engine, it will be understood that it could be a stationary engine used for an industrial application or the like.

While the above description constitutes a plurality of embodiments of the present invention, it will be appreciated that the present invention is susceptible to further modification and change without departing from the fair meaning of the accompanying claims.

The invention claimed is:

1. A spring assembly for an isolator or other torque transfer device, comprising:
   a first helical compression spring and a second helical compression spring, wherein each of the helical compression springs has a central aperture and has a first end and a second end, wherein the second spring is coaxial with and and nested within the central aperture of the first spring;
   a retainer having a base and a post that extends from the base into the central aperture at the first end of the second helical spring; and
   a spring housing that has an interior space in which the first and second springs are positioned, and further includes a base-engaging aperture that holds the base of the retainer, wherein the spring housing includes a drive wall that is engaged with the first ends of the first and second springs while the base is held in the base-engaging aperture.

2. A spring assembly as claimed in claim 1, wherein the retainer is made from a polymeric material.

3. A spring assembly as claimed in claim 1, wherein the first spring and the second spring are made from a metal.

4. A spring assembly as claimed in claim 1, wherein the base extends across the first end of both the first spring and the second spring.

5. A spring assembly as claimed in claim 1, wherein the spring housing is made from two pieces.

6. A spring assembly as claimed in claim 5, wherein the spring housing includes a first piece and a second piece that together define the base-engaging structure and provide a press-fit with the base of the retainer.

7. A spring assembly as claimed in claim 1, wherein the first spring and the second spring are arcuate and have different arc lengths.

8. An isolator for isolating torsional vibration between an input member and an output member, comprising:
   a first rotary drive member that is engageable with one of the input and output members;
   a second rotary drive member that is engageable with the other of the input and output members;
   a first helical compression spring and a second helical compression spring, wherein each of the helical compression springs has a central aperture and has a first end and a second end, wherein the second spring is coaxial with and nested within the central aperture of the first spring;
   a retainer having a base and a post that extends from the base into the central aperture at the first end of the second helical spring; and
   a spring housing that has an interior space in which the first and second springs are positioned, and further includes a base-engaging aperture that holds the base of the retainer, wherein the spring housing includes a drive wall that is engaged with the first ends of the first and second springs while the base is held in the base-engaging aperture.

9. An isolator as claimed in claim 8, wherein the retainer is made from a polymeric material.

10. An isolator as claimed in claim 8, wherein the first spring and the second spring are made from a metal.

11. An isolator as claimed in claim 8, wherein the base extends across the first end of both the first spring and the second spring.

12. An isolator as claimed in claim 8, wherein the spring housing is made from two pieces.

13. An isolator as claimed in claim 12, wherein the spring housing includes a first piece and a second piece that together define the base-engaging structure and provide a press-fit with the base of the retainer.

14. An isolator as claimed in claim 8, wherein the first spring and the second spring are arcuate and have different arc lengths.

* * * * *